(12) United States Patent
Choi

(10) Patent No.: US 9,393,924 B2
(45) Date of Patent: Jul. 19, 2016

(54) AIRBAG DEVICE FOR VEHICLE

(71) Applicant: Kia Motors Corp., Seoul (KR)

(72) Inventor: Jun Yeol Choi, Seoul (KR)

(73) Assignee: Kia Motors Corp., Seoul (KR)

( * ) Notice: Subject to any disclaimer, the term of this patent is extended or adjusted under 35 U.S.C. 154(b) by 0 days.

(21) Appl. No.: 14/550,113

(22) Filed: Nov. 21, 2014

(65) Prior Publication Data

US 2016/0009240 A1    Jan. 14, 2016

(30) Foreign Application Priority Data

Jul. 11, 2014    (KR) .................. 10-2014-0087345

(51) Int. Cl.
| | |
|---|---|
| *B60R 21/239* | (2006.01) |
| *B60R 21/216* | (2011.01) |
| *B60R 21/2338* | (2011.01) |
| *B60R 21/237* | (2006.01) |

(52) U.S. Cl.
CPC .............. *B60R 21/216* (2013.01); *B60R 21/237* (2013.01); *B60R 21/239* (2013.01); *B60R 21/2338* (2013.01); *B60R 2021/2395* (2013.01); *B60R 2021/23382* (2013.01); *B60R 2021/23384* (2013.01)

(58) Field of Classification Search
CPC   B60R 21/2338; B60R 21/237; B60R 21/239; B60R 2021/23382; B60R 2021/2395
See application file for complete search history.

(56) References Cited

U.S. PATENT DOCUMENTS

| | | | | |
|---|---|---|---|---|
| 7,726,685 | B2 * | 6/2010 | Abe ...................... | B60R 21/233 280/736 |
| 7,992,897 | B2 * | 8/2011 | Sekino .................. | B60R 21/231 280/729 |
| 8,590,927 | B2 | 11/2013 | Mendez et al. | |
| 8,696,022 | B2 * | 4/2014 | Fischer ............... | B60R 21/2338 280/739 |
| 2007/0045997 | A1 * | 3/2007 | Abe ...................... | B60R 21/231 280/729 |
| 2007/0145729 | A1 * | 6/2007 | Ishiguro ............... | B60R 21/239 280/739 |
| 2008/0007038 | A1 * | 1/2008 | Fischer ................ | B60R 21/233 280/743.2 |

(Continued)

FOREIGN PATENT DOCUMENTS

| | | |
|---|---|---|
| JP | 2008-049716 A | 3/2008 |
| JP | 2010-116010 A | 5/2010 |

(Continued)

*Primary Examiner* — Barry Gooden, Jr.
(74) *Attorney, Agent, or Firm* — Morgan, Lewis & Bockius LLP

(57) ABSTRACT

An airbag device for a vehicle may include a main vent hole disposed in an airbag cushion and emit expansion gas therein, a cover disposed on an outer side of the airbag cushion, to be switched between an opened state and a closed state, by a tension force applied thereto, and provided with an auxiliary vent hole through which the expansion gas inside the airbag cushion may be emitted, a tether having a first one end connected to the cover through the main vent hole and a second end fixed inside the airbag cushion to provide the tension force to the cover, and a tether guide disposed on an inner side of the airbag cushion to support the tether and make the tether pass therethrough while being slid on the inner side of the airbag cushion.

12 Claims, 6 Drawing Sheets

(56) References Cited

U.S. PATENT DOCUMENTS

| | | | |
|---|---|---|---|
| 2008/0315567 A1* | 12/2008 | Fischer | B60R 21/233 280/732 |
| 2009/0121460 A1* | 5/2009 | Abe | B60R 21/233 280/728.3 |
| 2010/0001498 A1* | 1/2010 | Abe | B60R 21/2338 280/739 |
| 2010/0019476 A1* | 1/2010 | Pausch | B60R 21/2338 280/742 |
| 2010/0032931 A1* | 2/2010 | Kumagai | B60R 21/2338 280/742 |
| 2010/0102542 A1* | 4/2010 | Nakajima | B60R 21/233 280/743.2 |
| 2010/0133798 A1* | 6/2010 | Fukawatase | B60R 21/2338 280/743.2 |
| 2011/0031723 A1* | 2/2011 | Fischer | B60R 21/233 280/730.1 |
| 2012/0104737 A1* | 5/2012 | Fischer | B60R 21/2338 280/742 |
| 2013/0134697 A1* | 5/2013 | Choi | B60R 21/239 280/743.2 |
| 2014/0151989 A1* | 6/2014 | Iwamoto | B60R 21/239 280/743.2 |
| 2014/0175778 A1* | 6/2014 | Choi | B60R 21/2338 280/743.2 |
| 2015/0014969 A1* | 1/2015 | Choi | B60R 21/239 280/730.1 |
| 2015/0091279 A1* | 4/2015 | Anderson | B60R 21/239 280/729 |
| 2015/0183392 A1* | 7/2015 | Jang | B60R 21/239 280/739 |
| 2016/0031408 A1* | 2/2016 | Ko | B60R 21/239 280/729 |

FOREIGN PATENT DOCUMENTS

| | | |
|---|---|---|
| KR | 10-2005-0076044 A | 7/2005 |
| KR | 10-2011-0129723 A | 12/2011 |
| KR | 10-1356178 B1 | 1/2014 |
| KR | 10-2014-0035140 A | 3/2014 |
| KR | 10-2014-0083334 A | 7/2014 |

* cited by examiner

AIRBAG DEVICE FOR VEHICLE

CROSS REFERENCE TO RELATED APPLICATION

The present application claims priority to Korean Patent Application No. 10-2014-0087345, filed Jul. 11, 2014, the entire contents of which is incorporated herein for all purposes by this reference.

BACKGROUND OF THE INVENTION

1. Field of the Invention

The present invention relates to an airbag, and more particularly, to an airbag device for a vehicle which may rapidly be deployed at an initial time of a deployment of an airbag cushion, exhibit appropriate shock absorbing performance when passengers are loaded, and satisfy a low risk deployment (LRD) regulation of North America to reduce an injury of children or passengers located in the vicinity of the airbag device.

2. Description of Related Art

An airbag absorbs a shock applied to passengers by appropriately expanding an airbag cushion when an accident of a vehicle occurs to reduce or prevent an injury of the passengers and therefore an expansion behavior of the airbag cushion is very critical to secure safety of the passengers.

In particular, the required expansion behavior of the airbag cushion needs to rapidly restrict the passengers by being rapidly expanded at an initial time of the deployment and appropriately emit expansion gas inside the airbag cushion when passengers are loaded to apply a load while starting to contact the airbag cushion, thereby appropriately absorbing a shock applied to the passengers.

Further, the airbag device needs to meet requirements of various regulations such as a low risk deployment (LRD) regulation of North America. In the case of the LRD regulation, the airbag cushion needs to emit the expansion gas through a vent hole at the initial time of deployment to minimize an injury of children or passengers located in the vicinity of the airbag device. Hereinafter, performance to satisfy the LRD regulation is referred to as LRD performance.

By the way, to meet the LRD performance as described above, the vent hole of the airbag cushion needs to be opened even at the initial time of the deployment of the airbag cushion to be able to partially emit the expansion gas and to rapidly expand the airbag cushion as described above, the vent hole needs to be closed at the initial time of the deployment of the airbag cushion if possible and once passengers do not start to load until the airbag cushion reaches a fully deployed state, the vent hole needs to be opened to be able to emit the expansion gas. As such, it is difficult to appropriately open or close the vent hole at an appropriate timing in response to a progress of the deployment process of the airbag cushion, a seating condition of passengers, or the like.

Meanwhile, a related art entitled "Airbag Cushion Having Variable Vent" is disclosed.

However, the above related art is also hardly to open or close the vent hole at an appropriate timing in response to the progress of the deployment process of the airbag cushion, the seating condition of the passengers, or the like.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airbag device for a vehicle which may rapidly be deployed at an initial time of a deployment of an airbag cushion, exhibit appropriate shock absorbing performance when passengers are loaded, and satisfy LRD performance to reduce an injury of children or passengers located in the vicinity of the airbag device.

Further, various aspects of the present invention are directed to providing an airbag device for a vehicle capable of reducing an excessive gas pressure inside an airbag cushion at the time of deploying the airbag cushion to prevent the airbag cushion from being damaged.

According to an aspect of the present invention, there is provided an airbag device for a vehicle, including a main vent hole configured to be disposed in an airbag cushion and emit expansion gas therein, a cover configured to be disposed on an outer side of the airbag cushion, to be switched between an opened state of the main vent hole while being spaced apart from the main vent hole and a closed state of the main vent hole while adhering to the main vent hole, by a tension force applied thereto, and provided with an auxiliary vent hole through which expansion gas inside the airbag cushion is emitted, a tether configured to have one end connected to the cover and the other end fixed inside the airbag cushion to provide the tension force to the cover through the main vent hole, and a tether guide configured to be disposed on an inner side of the airbag cushion to support the tether and make the tether pass therethrough while being slid on the inner side of the airbag cushion.

The airbag device may further include a sealing member configured to be provided between the main vent hole and the tether guide to support the tether and make the tether passing through the tether guide pass therethrough while being slid on an inner side of the airbag cushion.

The auxiliary vent hole may be formed to be disposed inside the main vent hole in a state in which the cover closes the main vent hole.

The auxiliary vent hole may be formed to be disposed outside the main vent hole in a state in which the cover closes the main vent hole.

The main vent hole may be disposed on a side of the airbag cushion, the tether may have the other end fixed in front of the airbag cushion, and the tether guide may be disposed inside a portion at which a head of a passenger contacts the airbag cushion.

The cover may be partially bonded to the airbag cushion to enclose a circumference of the main vent hole and the rest portion thereof may be opened, such that the cover is formed to form an outlet having a pocket shape so as to make the expansion gas emitted through the main vent hole be emitted into the atmosphere, along with the outer side of the airbag cushion.

The cover may be provided with a space in which a main part having a quadrangular shape is formed as a size covering the main vent hole and a side part extendedly is formed at a front end and both side ends of the main part, the main part being spaced apart from a surface of the airbag cushion by unfolding the side part, and the front end and both side ends of the side part extending from the main part may be directly bonded to the airbag cushion, enclosing the circumference of the main vent hole, an edge portion between the front end and both side ends of the main part and an edge portion between the front end and both side ends of the side part may be formed in a curved shape having a predetermined radius, and a back end of the side part may be opened, spaced apart from the airbag cushion in a free state.

A back end of the main part may more extend backward than the back end of the side part in the state in which the cover closes the main vent hole.

A back end of the main part may be overlappingly sewed and the tether may be connected to the back end of the main part.

A width of the tether connected to the back end of the main part may be formed to be shorter than a width of the back end of the main part and a diameter of the main vent hole.

The sealing member may be provided at a position close to the main vent hole.

The sealing member may be configured to be provided in the inner side of the airbag cushion to support the tether, make the tether pass through a sealing guide while being slid on the inner side of the airbag cushion, and make one end of the tether passing through the sealing guide be connected to the cover.

The airbag device may further include a shape keeping tether having front and back ends and both ends fixed inside the airbag cushion to regulate a deployment shape of the airbag cushion, wherein the front end of the shape keeping tether is fixed in front of the airbag cushion, along with the other end of the tether.

The airbag cushion may be provided in the state in which it is folded inside an airbag housing and at the time of folding the airbag cushion, the cover may be provided in the state in which the airbag cushion is unfolded to the outside.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
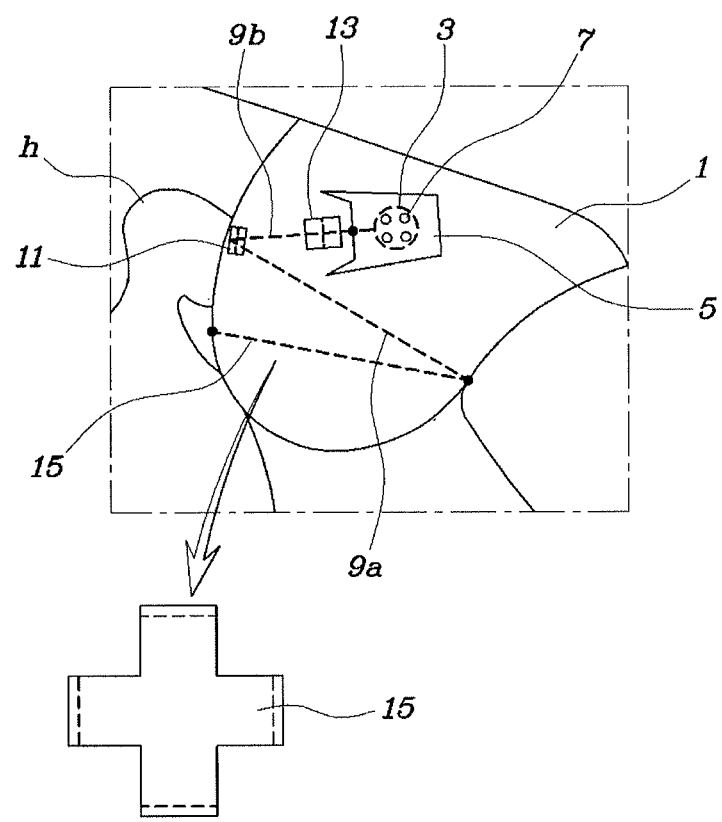
FIG. 1 is a diagram illustrating a closed structure of a main vent hole by a tether at an initial time of a deployment of an airbag device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in detail with reference to the accompanying drawings.

An airbag device for a vehicle according to an exemplary embodiment of the present invention may be configured to include a main vent hole 3, a cover 5, a tether 9, and a tether guide 11.

Describing in detail a configuration of the airbag device according to the exemplary embodiment of the present invention with reference to FIGS. 1 to 4, the airbag device is configured to include a main vent hole 3 configured to be disposed in an airbag cushion 1 and emit expansion gas therein, a cover 5 configured to be disposed on an outer side of the airbag cushion 1, to be switched between an opened state of the main vent hole 3 while being spaced apart from the main vent hole 3 and a closed state of the main vent hole 3 while adhering to the main vent hole 3, by a tension force applied thereto, and provided with an auxiliary vent hole 7 through which expansion gas inside the airbag cushion 1 is emitted, a tether 9 configured to have one end connected to the cover 5 and the other end fixed inside the airbag cushion 1 to provide the tension force to the cover 5 through the main vent hole 3, and a tether guide 11 configured to be disposed on an inner side of the airbag cushion 1 to support the tether 9 and make the tether 9 pass therethrough while being slid on the inner side of the airbag cushion 1.

In this configuration, the airbag cushion 1 may be the airbag cushion 1 which is deployed in front of a front passenger seat of a vehicle.

Further, the airbag device may further include a sealing member configured to be provided between the main vent hole 3 and the tether guide 11 to support the tether 9 and make the tether 9 passing through the tether guide 11 pass therethrough while being slid on the inner side of the airbag cushion 1.

That is, at the initial time of the deployment of the airbag cushion 1, the cover 5 stops the main vent hole 3 to be able to rapidly deploy the airbag cushion 1, the auxiliary vent hole 7 provided in the cover 5 prevents a pressure inside the airbag cushion 1 from being excessive, and when the passengers are loaded in the airbag cushion 1, the cover 5 is opened and thus the main vent hole 3 is opened to rapidly emit the gas inside the airbag cushion 1 even through the auxiliary vent hole 7 while appropriately absorbing a shock applied to the passengers.

Figure 8A:
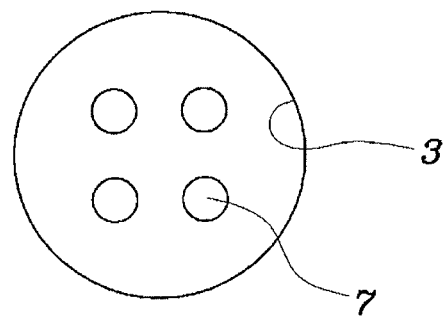
FIG. 8A, FIG. 8B and FIG. 8C are views illustrating various shapes of an auxiliary vent hole formed inside the main vent hole.
Figure 8B:
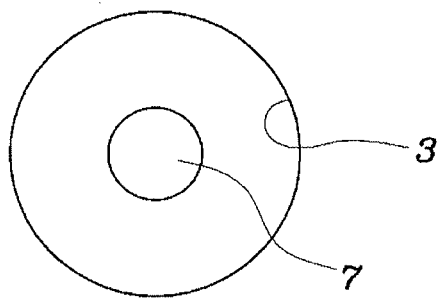
Figure 8C:
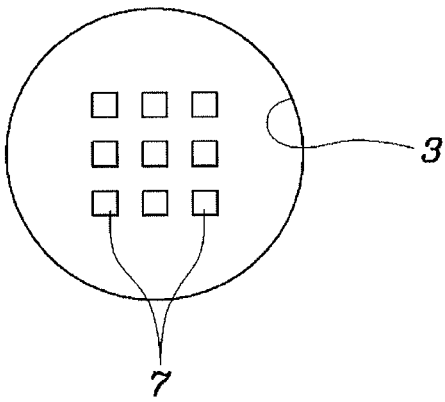

FIGS. 8A to 8C illustrate an example of the auxiliary vent hole 7, in which the auxiliary vent hole 7 may be formed to be disposed inside the main vent hole 3 in the state in which the cover 5 closes the main vent hole 3.

That is, when the auxiliary vent hole 7 is disposed inside the main vent hole 3, the cover 5 stops the main vent hole 3 at the time of deploying the airbag cushion 1 to rapidly deploy the airbag cushion 1 and the auxiliary vent hole 7 emits the gas inside the airbag cushion 1 to prevent the pressure inside the airbag cushion 1 from being excessive, thereby preventing the airbag cushion 1 from being damaged and the auxiliary vent hole 7 continuously emits the gas to make LRD performance more be improved and is very useful to continuously emit the gas inside the airbag cushion 1.

Figure 9A:
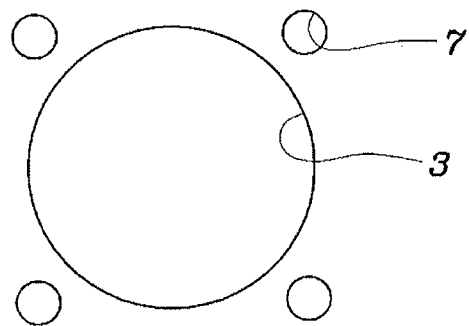
FIG. 9A, FIG. 9B and FIG. 9C are views illustrating various shapes of the auxiliary vent hole formed outside the main vent hole.
Figure 9B:
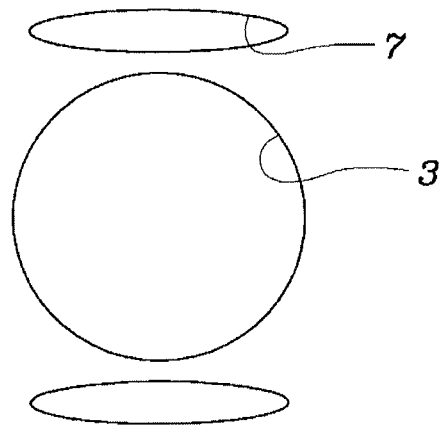
Figure 9C:
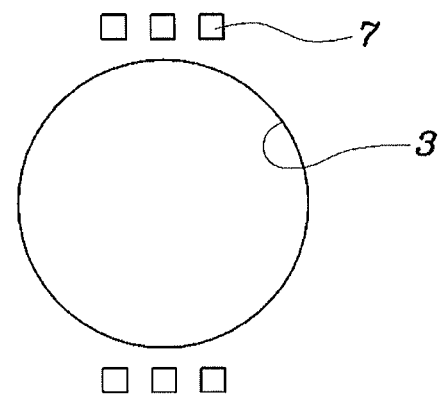

Further, FIGS. 9A to 9C illustrate another example of the auxiliary vent hole 7, in which the auxiliary vent hole 7 may be formed to be disposed outside the main vent hole 3 in the state in which the cover 5 closes the main vent hole 3.

That is, when the auxiliary vent hole 7 is disposed outside the main vent hole 3, the airbag cushion 1 is more rapidly deployed by minimizing an amount of gas emitted through the auxiliary vent hole 7 at the time of deploying the airbag cushion 1 and when the gas is emitted through the main vent hole 3 at the time of loading the passengers, the auxiliary vent hole 7 minimizes an area of the cover 5 by which the emission of gas interferes and therefore makes the shock absorbing performance against the passengers and the LRD performance more be improved.

Figure 5:
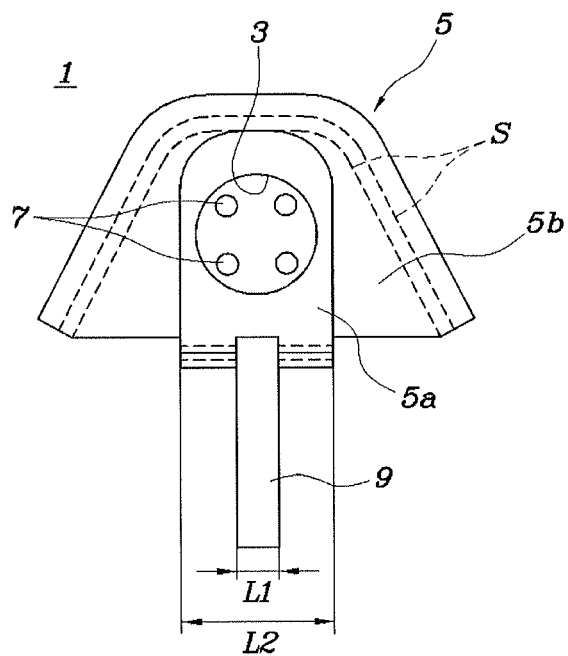
FIG. 5 is a view illustrating a shape of the cover of the airbag device according to the exemplary embodiment of the present invention.

Referring to FIGS. 1 and 5, the main vent hole 3 according to the exemplary embodiment of the present invention is disposed on a side of the airbag cushion 1, the tether 9 has the other end fixed in front of the airbag cushion 1, and the tether guide 11 is disposed inside a portion at which a head h of a passenger contacts the airbag cushion 1.

The tether guide 11 may have a structure in which both sides of the tether guide 11 are sewed in the airbag cushion 1 in the state in which a central portion of the tether guide 11 encloses the tether 9 along with the inner side of the airbag cushion 1.

Further, the cover 5 is partially bonded to the airbag cushion 1 to enclose a circumference of the main vent hole 3 and the rest portion thereof is opened, such that the cover may be formed to form an outlet having a pocket shape so as to make the expansion gas emitted through the main vent hole 3 be emitted into the atmosphere, along with the outer side of the airbag cushion 1.

That is, the cover 5 may be sewed on the airbag cushion 1 along a double sewing line s.

Here, the cover 5 is provided with a space in which a main part 5a having a quadrangular shape is formed as a size covering the main vent hole 3 and a side part 5b is extendedly formed at a front end and both side ends of the main part 5a, the main part 5a being spaced apart from a surface of the airbag cushion 1 by unfolding the side part 5b.

Further, the front end and both side ends of the side part 5b extending from the main part 5a are directly bonded to the airbag cushion 1, enclosing the circumference of the main vent hole 3, an edge portion between the front end and both side ends of the main part 5a and an edge portion between the front end and both side ends of the side part 5b are formed in a curved shape having a predetermined radius, and a back end of the side part 5b may be opened, spaced apart from the airbag cushion 1 in a free state.

Here, the side part 5b implements a 3D shape at the time of opening the cover 5 and is folded to facilitate assembling and a change in a specification.

In particular, the edge portion of the cover 5 is rounded in a curved shape to minimize the amount of gas emitted from the airbag cushion 1 remaining in the edge portion at the time of opening the cover 5, thereby smoothing the operability of the cover 5 and preventing the cover 5 from being damaged due to an excessive concentration of gas.

Further, the back end of the main part 5a may more extend backward than the back end of the side part 5b in the state in which the cover 5 closes the main vent hole 3.

That is, an end of the opened side of the main part 5a is connected to the tether 9 and thus the tether 9 is pulled to make the cover 5 close the main vent hole 3, such that a length of the main part 5a closing the main vent hole 3 is increased to improve sealing performance, thereby improving the initial deployment performance of the airbag cushion 1.

Further, the back end of the main part 5a is overlappingly sewed and the tether 9 may be connected to the back end of the main part 5a.

That is, when the cover 5 is closed, the back end portion of the main part 5a is an area which is applied with the greatest force by the pulling of the tether 9 and therefore the end portion of the main part 5a is overlappingly folded and sewed to reinforce the rigidity of the cover 5.

In addition, a width L1 of the tether 9 connected to the back end of the main part 5a is formed to be shorter than a width L2 of the back end of the main part 5a and a diameter of the main vent hole 3, such that when the cover 5 is closed, a leakage space through which air inside the airbag cushion 1 is leaked is formed in both sides of the main part 5a, thereby preventing the pressure inside the airbag cushion 1 from being excessive while rapidly deploying the airbag cushion 1.

Figure 3:
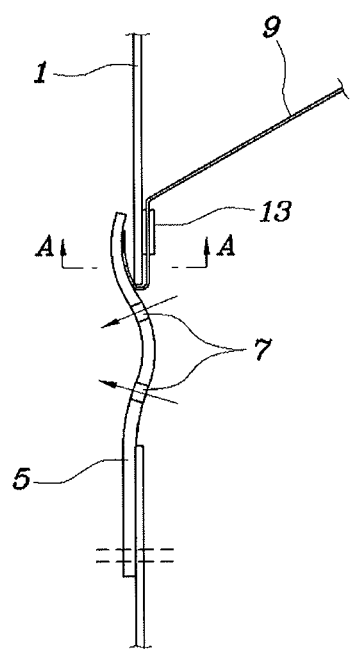
FIG. 3 is a partially cutaway view of the airbag cushion and a cover of FIG. 1.
Figure 6:
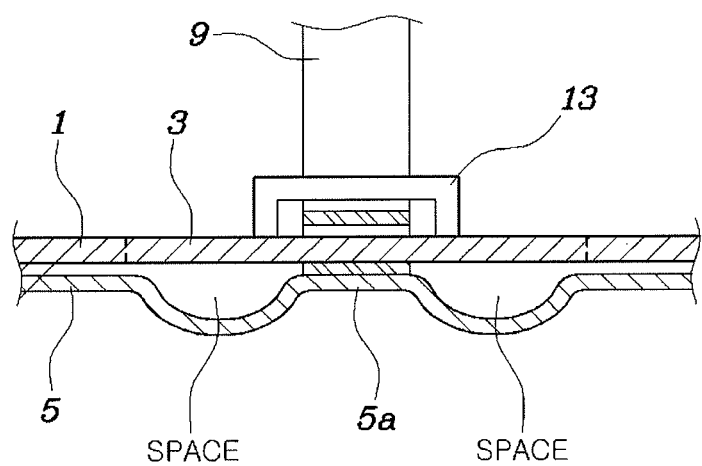
FIG. 6 is a cross-sectional view taken along the line A-A of FIG. 3.

That is, referring to FIGS. 3, 5, and 6, the main part 5a of the cover 5 is disposed outside the airbag cushion 1 and one end of the tether 9 passes through the main vent hole 3 from the inside of the airbag cushion 1 to be fixed to the end of the main part 5a.

Therefore, when the cover 5 is closed, the end of the main part 5a connected to one end of the tether 9 is pulled toward the main vent hole 3 and thus the width L1 of the tether 9 is formed to be shorter than the diameter of the main vent hole 3 and the width L2 of the back end of the main part 5a as described above, such that the space is formed in both sides of the main part 5a, thereby leaking a predetermined amount of air inside the airbag cushion through the space.

Figure 2:
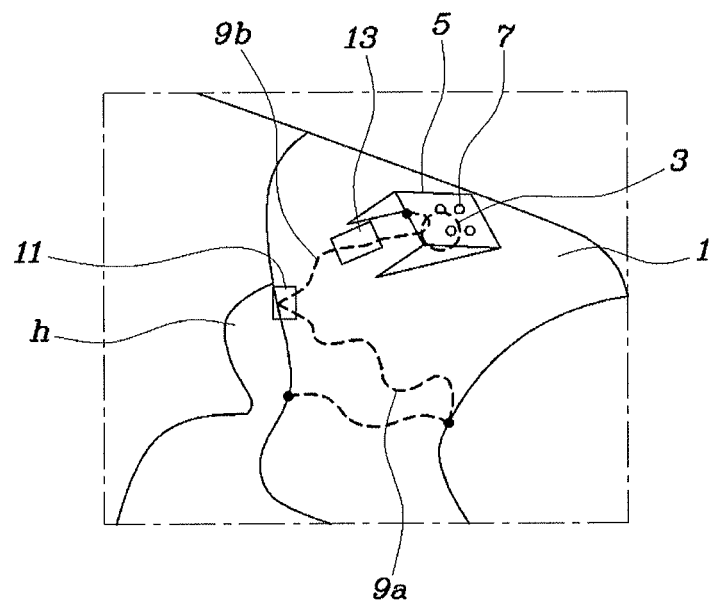
FIG. 2 is a diagram illustrating an opening structure of the main vent hole when passenger is supported to an airbag cushion of FIG. 1.

Meanwhile, as illustrated in FIGS. 1 and 2, the tether 9 may be divided into a first part 9a connecting a front portion of the airbag cushion 1 to a back portion thereof based on the tether guide 11 and a second part 9b extending to the side of the airbag cushion 1 to be connected to the cover 5 and the opening and closing action of the cover 5 is made by the pressure of the expansion gas inside the airbag cushion 1, a change in a relative length of the first part 9a and the second part 9b of the tether 9, and the like.

According to the exemplary embodiment of the present invention, the sealing member may be provided at a position close to the main vent hole 3.

Figure 4:
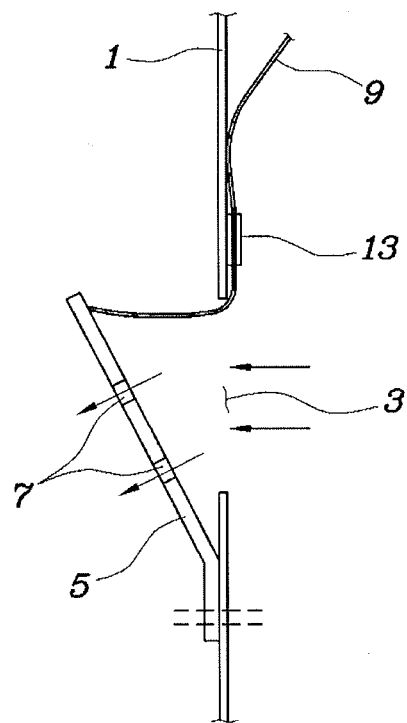
FIG. 4 is a partially cutaway view of an airbag cushion and a cover of FIG. 2.

Describing the configuration of the sealing member with reference to FIGS. 3 and 4, the sealing member may be configured to be provided in the inner side of the airbag cushion 1 to support the tether 9, make the tether 9 pass through a sealing guide 13 while being slid on the inner side of the airbag cushion 1, and make one end of the tether 9 passing through the sealing guide 13 be connected to the cover 5.

According to the airbag device configured as described above, as illustrated in FIG. 1, the back portion of the airbag cushion 1 mounted with the tether guide 11 at the time of the initial deployment of the airbag cushion 1 is progressed backward toward the head h of the passenger. In this case, the second part 9b is pulled depending on the relative movement of the tether guide 11 as illustrated in an arrow and thus the tether 9 tends to move to the first part 9a, such that the cover 5 closes the main vent hole 3, thereby rapidly deploying the airbag cushion 1 in the early time.

In particular, the second part is slid along the side of the airbag cushion 1 while being supported at the position close to the main vent hole 3 by the sealing guide 13 and thus pulled, such that the main vent hole 3 is sealed, thereby minimizing a loss of the expansion gas emitted through the main vent hole 3 to improve the initial deployment performance of the airbag cushion 1.

However, when the auxiliary vent hole 7 is formed to be disposed inside the main vent hole 3, the expansion gas inside the airbag cushion 1 is emitted through the auxiliary vent hole 7, thereby preventing the pressure inside the airbag cushion 1 from excessively rising while keeping the initial deployment performance of the airbag cushion 1 to a some extent to prevent the airbag cushion 1 from being damaged.

Meanwhile, referring to FIGS. 1 and 2, a shape keeping tether 15 having front and back ends and both ends fixed inside the airbag cushion 1 to regulate the deployment shape of the airbag cushion 1 may be further provided. Here, the shape keeping tether 15 is formed in a (+) shape (cross shape) and thus the front, back, left, and right ends of the shape keeping tether 15 are each fixed to the front, back, left, and right inside the airbag cushion 1, thereby appropriately keeping the deployment shape of the airbag cushion 1 at the desired shape at the time of deploying the airbag cushion 1.

In particular, the front end of the shape keeping tether 15 may be fixed in front of the airbag cushion 1, along with the other end of the tether 9.

That is, both of the front end of the shape keeping tether 15 and the front end of the tether 9 are fixed in front of the airbag cushion 1, thereby reducing working man-hour required to fix the tether 9 and the shape keeping tether 15 to the airbag cushion 1.

FIG. 4 illustrates a condition in which the airbag cushion 1 is deployed and then the head h of the passenger is loaded in the airbag cushion 1. In this case, as the head h of the passenger pushes the back portion of the airbag cushion 1 forward, the tether guide 11 moves forward and the expansion gas applies a force pushing the cover 5 to the outside, and therefore the first part 9a is pulled to move the tether 9 to the second part 9b, such that the second portion 9b of the tether 9 is long and the cover 5 opens the main vent hole 3 to emit the expansion gas inside the airbag cushion 1 through the main vent hole 3, thereby absorbing the shock applied to the passenger from the airbag cushion 1.

In particular, the cover 5 is provided with the auxiliary vent hole 7 to reduce the portion at which the expansion gas emitted from the airbag cushion 1 interferes by the cover 5 so as to more rapidly emit the expansion gas, thereby improving the shock absorbing performance.

Meanwhile, the airbag cushion 1 according to the exemplary embodiment of the present invention is provided in the state in which it is folded inside the airbag housing 17 and at the time of folding the airbag cushion 1, the cover 5 may be provided in the state in which the airbag cushion 1 is unfolded to the outside.

Figure 7:
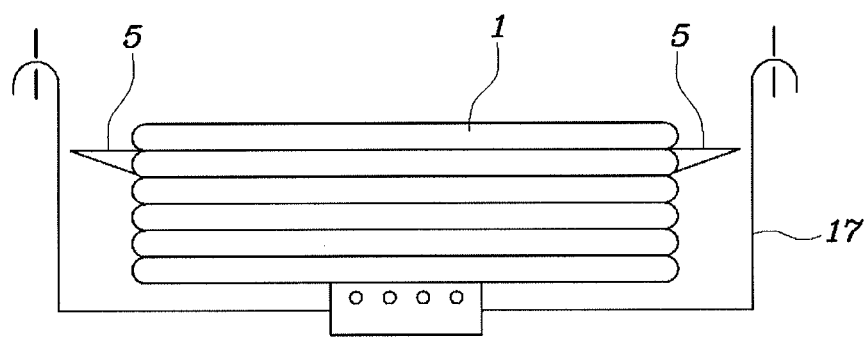
FIG. 7 is a view illustrating a state in which the airbag cushion according to the exemplary embodiment of the present invention is folded and received in an airbag housing.

That is, referring to FIG. 7, when the airbag cushion 1 is provided in the state in which it is folded inside the airbag housing 17, the cover 5 is not folded inwardly of the airbag cushion 1 and is received in the airbag housing 17 in the state in which it is unfolded to the outside of the airbag cushion 1.

Therefore, the main vent hole 3 is in an opened state before the cover 5 is closed by the tether 9 due to the receiving structure of the cover 5 at the time of the initial deployment of the airbag cushion 1, and therefore the expansion gas is emitted through the main vent hole 3, such that the appropriate LRD performance is exhibited even in the case of passengers like children, thereby more effectively protecting passengers like children.

As described above, according to the exemplary embodiments of the present invention, it is possible to rapidly deploy the airbag cushion by stopping the main vent hole with the cover and prevent the pressure inside the airbag cushion from being excessive with the auxiliary vent hole disposed in the cover, at the initial time of the deployment of the airbag cushion and it is possible to appropriately absorb a shock applied to the passengers by opening the main vent hole while opening the cover and appropriately secure the shock absorbing performance by rapidly emitting the gas inside the airbag cushion even through the auxiliary vent hole, when the passengers are loaded in the airbag cushion.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag device for a vehicle, comprising:
a main vent hole configured to be disposed in an airbag cushion and emit expansion gas therein;
a cover configured to be disposed on an outer side of the airbag cushion, to be switched between an opened state of the main vent hole while being spaced apart from the main vent hole and a closed state of the main vent hole while adhering to the main vent hole, by a tension force applied thereto, and provided with an auxiliary vent hole through which the expansion gas inside the airbag cushion is emitted;
a tether having a first end connected to the cover through the main vent hole and a second end fixed inside the airbag cushion to provide the tension force to the cover; and
a tether guide disposed on an inner side of the airbag cushion to support the tether and make the tether pass therethrough while being slid on the inner side of the airbag cushion; and
a sealing member configured to be provided between the main vent hole and the tether guide to support the tether and make the tether passing through the tether guide pass therethrough while being slid on the inner side of the airbag cushion, wherein the auxiliary vent hole is formed to be disposed inside the main vent hole in the closed state in which the cover closes the main vent hole.

2. The airbag device according to claim 1, wherein the main vent hole is disposed on a side of the airbag cushion; wherein the tether has a third end fixed in front of the airbag cushion; and wherein the tether guide is disposed inside a portion of the airbag cushion at which a head of a passenger is configured to contact the airbag cushion.

3. The airbag device according to claim 1, wherein a sealing member is provided at a position close to the main vent hole.

4. The airbag device according to claim 1, wherein a sealing member is configured to be provided in the inner side of the airbag cushion to support the tether, make the tether pass through a sealing guide while being slid on the inner side of the airbag cushion, and make one end of the tether passing through the sealing guide be connected to the cover.

5. The airbag device according to claim 1, further comprising:
a shape keeping tether having front and back ends and both of said front and back ends fixed inside the airbag cushion to regulate a deployment shape of the airbag cushion, wherein the front end of the shape keeping tether is fixed in front of the airbag cushion, along with the second end of the tether.

6. The airbag device according to claim 1, wherein the airbag cushion is provided in the state in which it is folded inside an airbag housing and at a time of folding the airbag cushion, the cover is provided in a state in which the cover is unfolded to an outside of the airbag cushion.

7. The airbag device according to claim 1, wherein the cover is partially bonded to the airbag cushion to enclose a portion of a circumference of the main vent hole and a rest portion thereof is opened, such that the cover is configured to form an outlet having a pocket shape to make the expansion gas emitted through the main vent hole be emitted into the atmosphere, along with the outer side of the airbag cushion.

8. The airbag device according to claim 7, wherein the cover is provided with a space in which a main part having a quadrangular shape is formed as a size covering the main vent hole and a side part is extendedly formed at a front end and both side ends of the main part, the main part being spaced apart from a surface of the airbag cushion by unfolding the side part, and wherein a front end and both side ends of the side part extending from the main part are directly bonded to the airbag cushion, enclosing the portion of the circumference of the main vent hole, an edge portion between the front end and both side ends of the main part and an edge portion between the front end and both side ends of the side part are formed in a curved shape having a predetermined radius, and a back end of the side part is opened, spaced apart from the airbag cushion in a free state.

9. The airbag device according to claim 8, wherein a back end of the main part is overlappingly sewed and the tether is connected to the back end of the main part.

10. The airbag device according to claim 8, wherein a width of the tether connected to a back end of the main part is formed to be shorter than a width of the back end of the main part and a diameter of the main vent hole.

11. The airbag device according to claim 8, wherein a back end of the main part more extends backward than the back end of the side part in a state in which the cover closes the main vent hole.

12. An airbag device for a vehicle, comprising:
a main vent hole configured to be disposed in an airbag cushion and emit expansion gas therein;

a cover configured to be disposed on an outer side of the airbag cushion, to be switched between an opened state of the main vent hole while being spaced apart from the main vent hole and a closed state of the main vent hole while adhering to the main vent hole, by a tension force applied thereto, and provided with an auxiliary vent hole through which the expansion gas inside the airbag cushion is emitted;

a tether having a first end connected to the cover through the main vent hole and a second end fixed inside the airbag cushion to provide the tension force to the cover; and a tether guide disposed on an inner side of the airbag cushion to support the tether and make the tether pass therethrough while being slid on the inner side of the airbag cushion; and a sealing member configured to be provided between the main vent hole and the tether guide to support the tether and make the tether passing through the tether guide pass therethrough while being slid on the inner side of the airbag cushion, wherein the cover is partially bonded to the airbag cushion to enclose a portion of a circumference of the main vent hole and a rest portion thereof is opened, such that the cover is configured to form an outlet having a pocket shape to make the expansion gas emitted through the main vent hole be emitted into the atmosphere, along with the outer side of the airbag cushion, wherein the cover is provided with a space in which a main part having a quadrangular shape is formed as a size covering the main vent hole and a side part is extendedly formed at a front end and both side ends of the main part, the main part being spaced apart from a surface of the airbag cushion by unfolding the side part, wherein a front end and both side ends of the side part extending from the main part are directly bonded to the airbag cushion, enclosing the portion of the circumference of the main vent hole, an edge portion between the front end and both side ends of the main part and an edge portion between the front end and both side ends of the side part are formed in a curved shape having a predetermined radius, and a back end of the side part is opened, spaced apart from the airbag cushion in a free state, and wherein a back end of the main part more extends backward than the back end of the side part in the closed state in which the cover closes the main vent hole.

* * * * *